April 14, 1925.
A. M. GODWIN
1,533,988
BUMPER FOR VEHICLES
Filed June 19, 1924
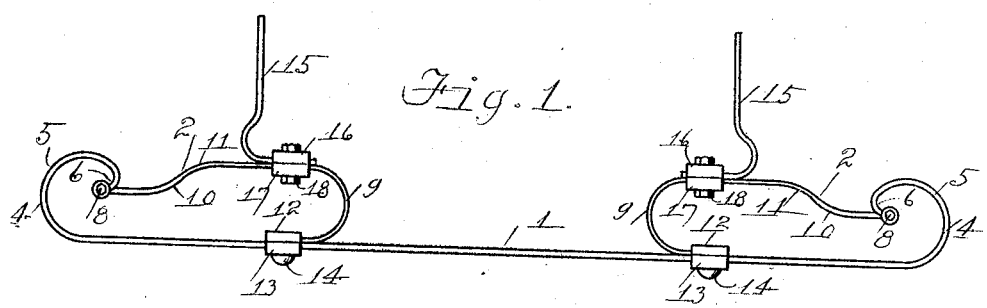
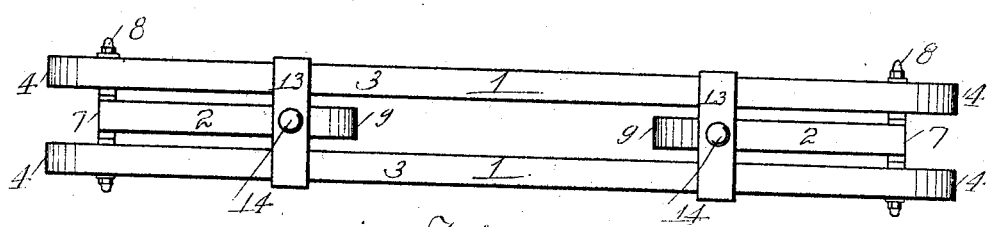
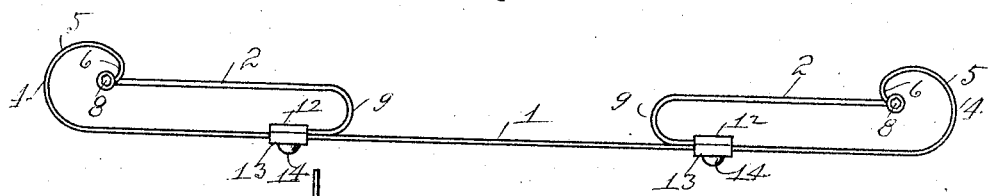
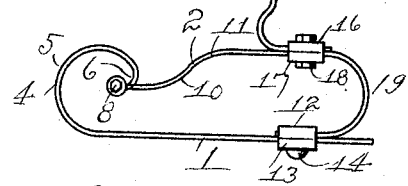
Witness:
Geo L. Chapes
Inventor
Arthur M. Godwin
By Cyrus W. Rice
Attorney Patented Apr. 14, 1925.

1,533,988

UNITED STATES PATENT OFFICE.

ARTHUR M. GODWIN, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

BUMPER FOR VEHICLES.

Application filed June 19, 1924. Serial No. 720,938.

*To all whom it may concern:*

Be it known that I, ARTHUR M. GODWIN, a citizen of the United States, residing at Grand Rapids, in the county of Kent and State of Michigan, have invented new and useful Improvements in Bumpers for Vehicles, of which the following is a specification.

The present invention relates to bumpers for vehicles; and its object is, generally, to provide an improved device of that character whereby the vehicle may be protected from injuries which might otherwise result from contact with extraneous objects.

This and any other and more specific objects hereinafter appearing are attained by, and the invention finds preferable embodiment in, the structure hereinafter particularly described in the body of this specification and illustrated by the accompanying drawings, in which:—

Figure 1 is a top plan view of a bumper for vehicles, with supporting or mounting members therefor;

Figure 2 is a face view thereof;

Figure 3 is a top plan view of a modified construction of the same; and

Figure 4 is a top plan view of the end parts of the bumper shown in other views, and illustrating a construction particularly adapted to be mounted on the rear of the vehicle.

In the constructions illustrated by the drawings, the bumper for vehicles (such as automobiles) is horizontally disposed and extends transversely of the vehicle, being carried at its front or rear end. This bumper comprises two connected spring elements, formed of resilient steel bars, viz: an impact element, designated generally 1, adapted to receive the thrusts from extraneous objects, and a second spring element 2 whereby the impact element is supported and the bumper's cushioning resiliency augmented. The impact element desirably comprises a pair of members 3, 3 disposed parallelly, one above the other, and having outer end portions 4, 4 (i. e., portions adjacent the sides of the vehicle) which are curved toward the vehicle, as seen at 5, and preferably then curved outwardly as seen at 6. The bumper's second spring element 2 is secured adjacent its outer end 7 to the impact element's said end portion, preferably turnably as shown about a vertical pintle 8. The second spring element 2 has an inner end portion 9 curved toward the impact element 1 and outwardly (i. e., toward the adjacent side of the vehicle), and secured, preferably rigidly as shown, to the impact element 1. This element 2 may extend in a line approximately straight in a horizontal plane between its point of attachment with the curved outer end of the impact element to the curved inner end portion 9 of the element 2 as shown in Figure 3; preferably however, this element 2 has a portion intermediate its said ends which extends from its said outer end in a curve, first toward the vehicle as shown at 10 and then reversely as shown at 11.

In the preferable construction illustrated, the second spring element 2 is secured to the outer end of the impact element 1 between the two members 3, 3 thereof; and its inner end portion is secured to the impact element between said members, in any suitable or well known way, as by the clamp members 12, 13 drawn together as by the screw bolt 14. The bumper may be mounted on the vehicle in any suitable manner and by any well known means, as by the members 15 which are preferably resilient and are preferably clamped to the second spring elements 2 by clamp members 16, 17 drawn together by screw bolts 18, these members 15 being secured to the vehicle in any suitable or well known manner.

In Figures 1, 2 and 3, a bumper extending from side to side of the vehicle is shown, comprising identically formed end parts. This form is particularly adapted for use on the front of the vehicle.

In Figure 4 however, is illustrated a bumper comprising the parts at one end only of the structure shown in the other views. This bumper shown in Figure 4 is particularly adapted for use at the rear of the vehicle, and adjacent one side thereof, the end portion 4 being outside—i. e., next the adjacent side of the vehicle.

It will be seen that my bumper is peculiarly well adapted to cushion the vehicle on which it is mounted against thrusts from extraneous objects in all directions: A thrust directly against the flat face of the impact element 1 is cushioned not only by the main portion itself of that resilient element, but also by its curved end portions 4 and by the second spring element 2 and its curved inner end 9; while a thrust directed against (or near to) the curved end portion 4 of the impact element 1 is cushioned by said curved end portion and by the curved inner end portion 9 of the second element 2, and also, where this second element is curved at 10 and 11, such curvature augments the cushioning effect of the second element 2.

The invention being intended to be pointed out in the claims, is not to be limited to or by details of construction of the particular embodiment or embodiments thereof illustrated by the drawings or hereinbefore described.

I claim:

1. In a horizontally disposed bumper for vehicles extending transversely thereof: a spring impact element having an end portion curved toward the vehicle; a second spring element secured adjacent its outer end to the impact element's said end portion turnably about a vertical axis, and having an inner end portion curved toward the impact element and outwardly and secured to the impact element; means for mounting the bumper on the vehicle, secured thereto and to said second element intermediate its outer end and its said inner end portion.

2. In a horizontally disposed bumper for vehicles extending transversely thereof: a spring impact element having an end portion curved toward the vehicle; a second spring element secured adjacent its outer end to the impact element's said end portion turnably about a vertical axis, and having an inner end portion curved toward the impact element and outwardly and rigidly secured to the impact element; means for mounting the bumper on the vehicle, secured thereto and to said second element intermediate its outer end and its said inner end portion.

3. In a horizontally disposed bumper for vehicles extending transversely thereof: a impact element comprising a pair of spring members disposed parallelly one above the other and having outer end portions curved toward the vehicle; a second spring element secured adjacent its outer end to and between said member's said end portions turnably about a vertical axis, and having an inner end portion curved toward the impact element and outwardly and secured to and between said members; means for mounting the bumper on the vehicle, secured thereto and to said second element intermediate its outer end and its said inner end portion.

4. In a horizontally disposed bumper for vehicles extending transversely thereof: a spring impact element having an end portion curved toward the vehicle; a second spring element secured adjacent its outer end to the impact element's said end portion turnably about a vertical axis, and having an intermediate portion extending from its said outer end in a curve first towards the vehicle and then reversely, and having an inner end portion curved toward the impact element and outwardly and secured to the impact element; means for mounting the bumper on the vehicle, secured thereto and to said second element intermediate its outer end and its said inner end portion.

5. In a horizontally disposed bumper for vehicles extending transversely thereof: a spring impact element having an end portion curved toward the vehicle and then outwardly; a second spring element secured adjacent its outer end to the end of the impact member's said portion, and having an inner end portion curved toward the impact element and outwardly and secured to the impact element; means for mounting the bumper on the vehicle, secured thereto and to said second element intermediate its outer end and its said inner end portion.

6. In a horizontally disposed bumper for vehicles extending transversely thereof: a spring impact member having end portions curved toward the vehicle; a pair of second spring members secured adjacent their outer ends to the impact member's said end portions respectively turnably about vertical axes, and having inner end portions curved toward the impact member and outwardly and secured to the impact member; means for mounting the bumper on the vehicle, secured thereto and to said second members respectively intermediate their outer ends and their said inner end portions.

7. In a horizontally disposed bumper for vehicles extending transversely thereof: a spring impact element having an involuted end portion extending toward the vehicle; a second spring element connected adjacent its outer end to the impact element's said end portion; mounting means for the bumper connected to said second element remote from the point of its said connection to the impact element.

8. In a horizontally disposed bumper for vehicles extending transversely thereof: a spring impact element having an involuted end portion extending toward the vehicle; a second spring element pivotally connected adjacent its outer end to the impact element's said end portion; mounting means for the bumper connected to said second element remote from the point of its said connection to the impact element.

In testimony whereof I have hereunto set my hand at Grand Rapids, Michigan, this 9th day of June, 1924.

ARTHUR M. GODWIN.